Figure 1:
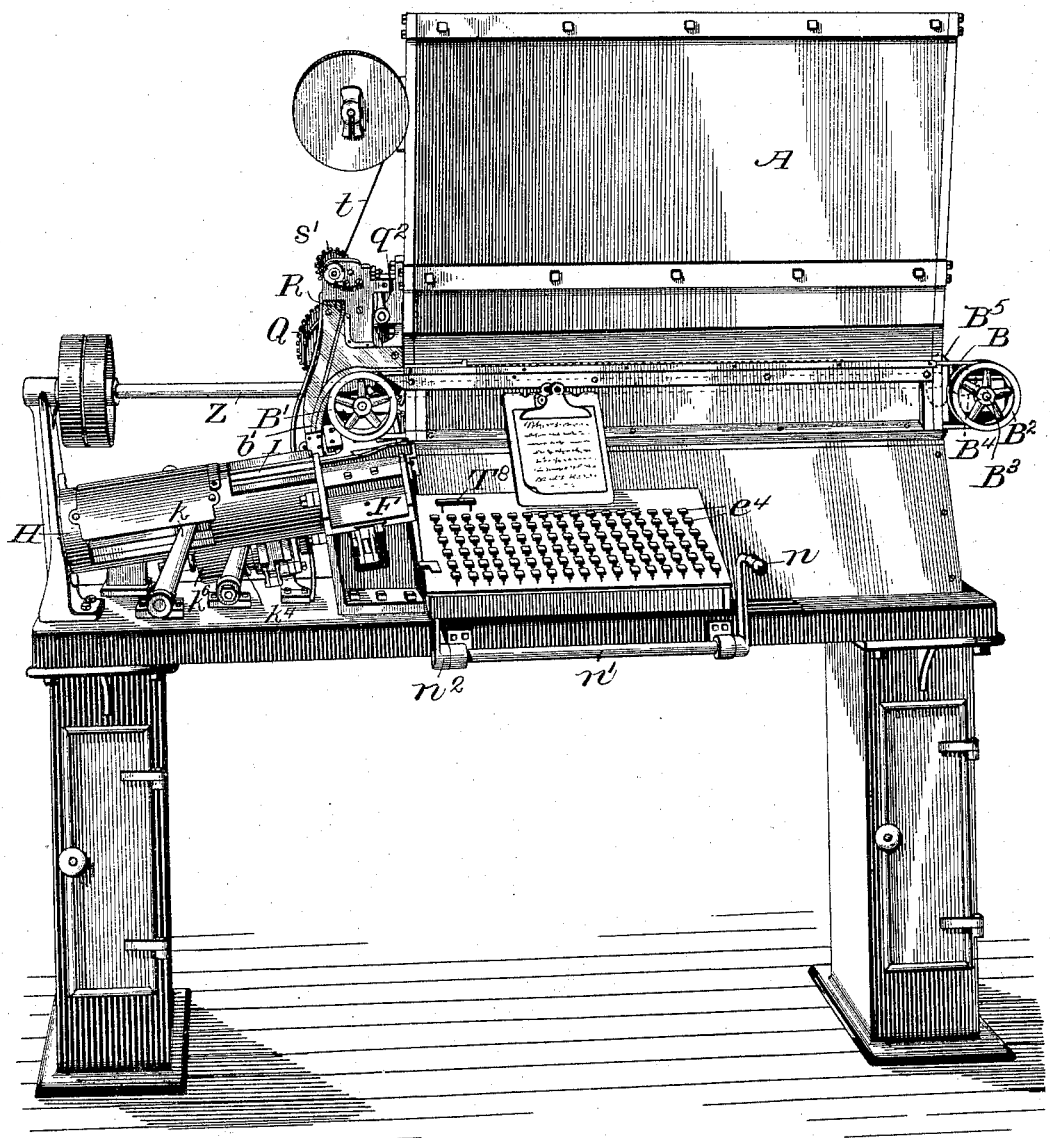

(No Model.)  10 Sheets—Sheet 1.

P. F. COX.
TYPE SETTING MACHINE.

No. 581,954. Patented May 4, 1897.

Witnesses
Jos. C. Stack
James R. Mansfield

Inventor
Paul F. Cox.
By Alexander & Dowell
Attys.

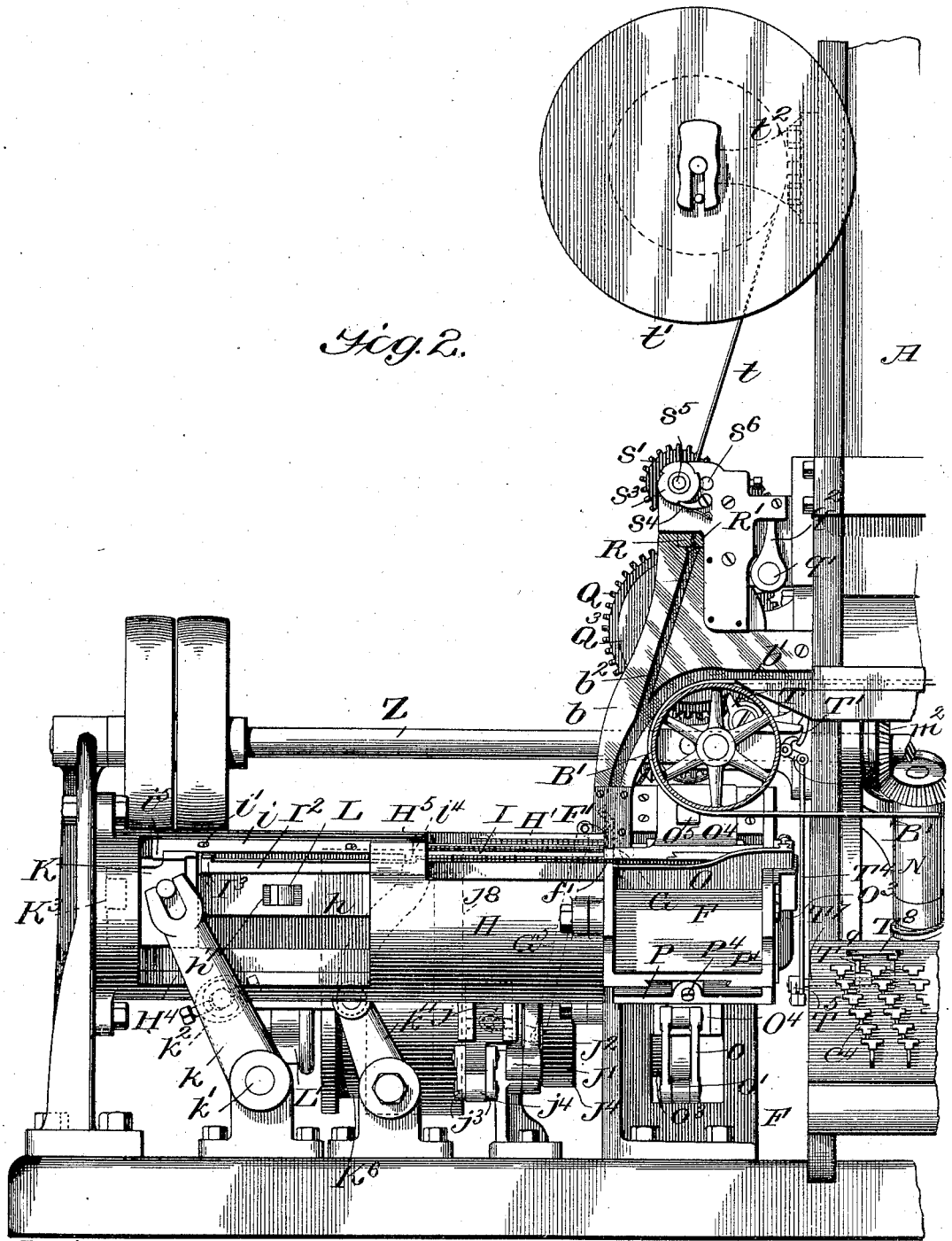

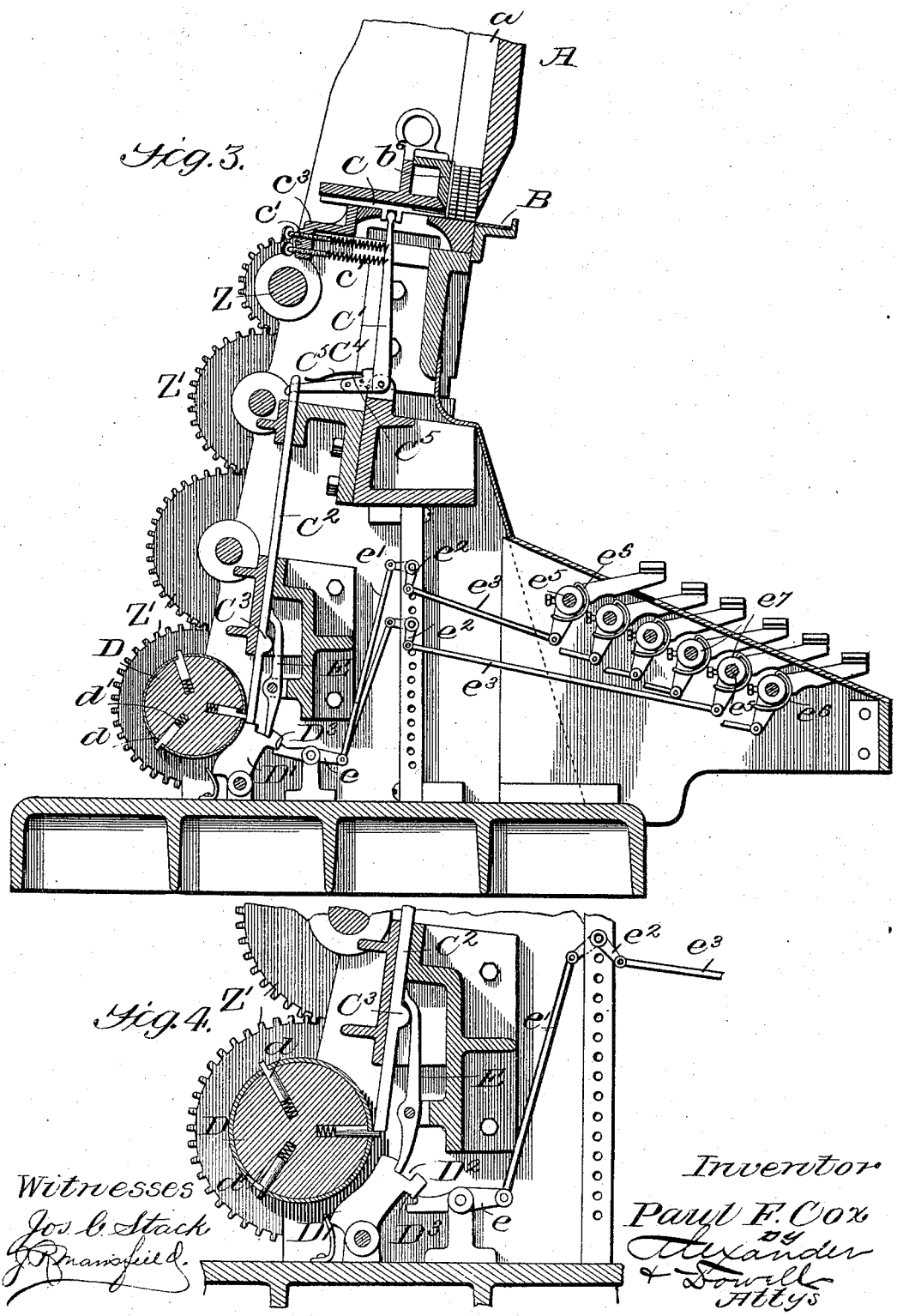

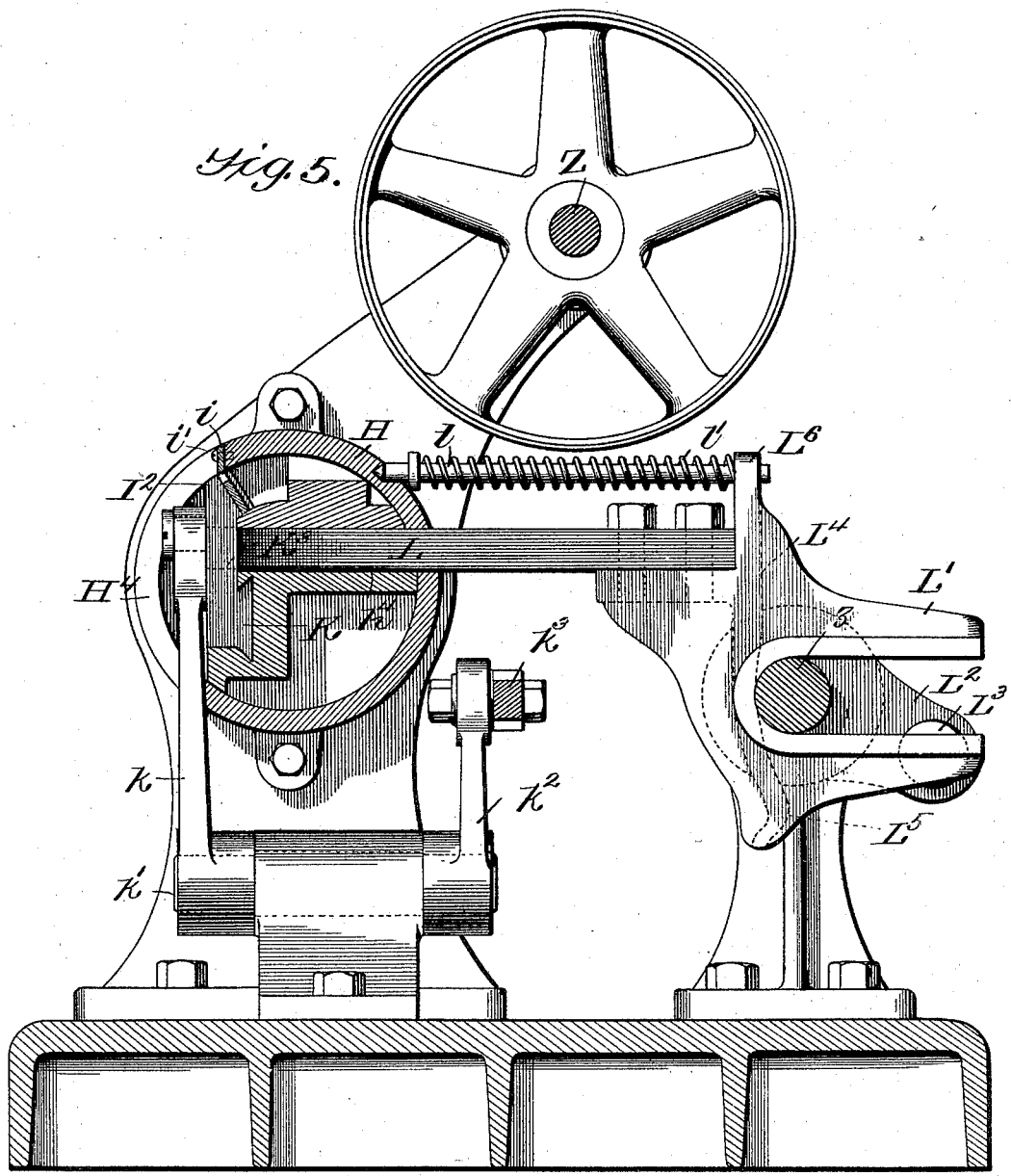

(No Model.) 10 Sheets—Sheet 5.

P. F. COX.
TYPE SETTING MACHINE.

No. 581,954. Patented May 4, 1897.

Witnesses
Jos. C. Stack
J. R. Mansfield

Inventor
Paul F. Cox
by Alexander & Dowell
Attys.

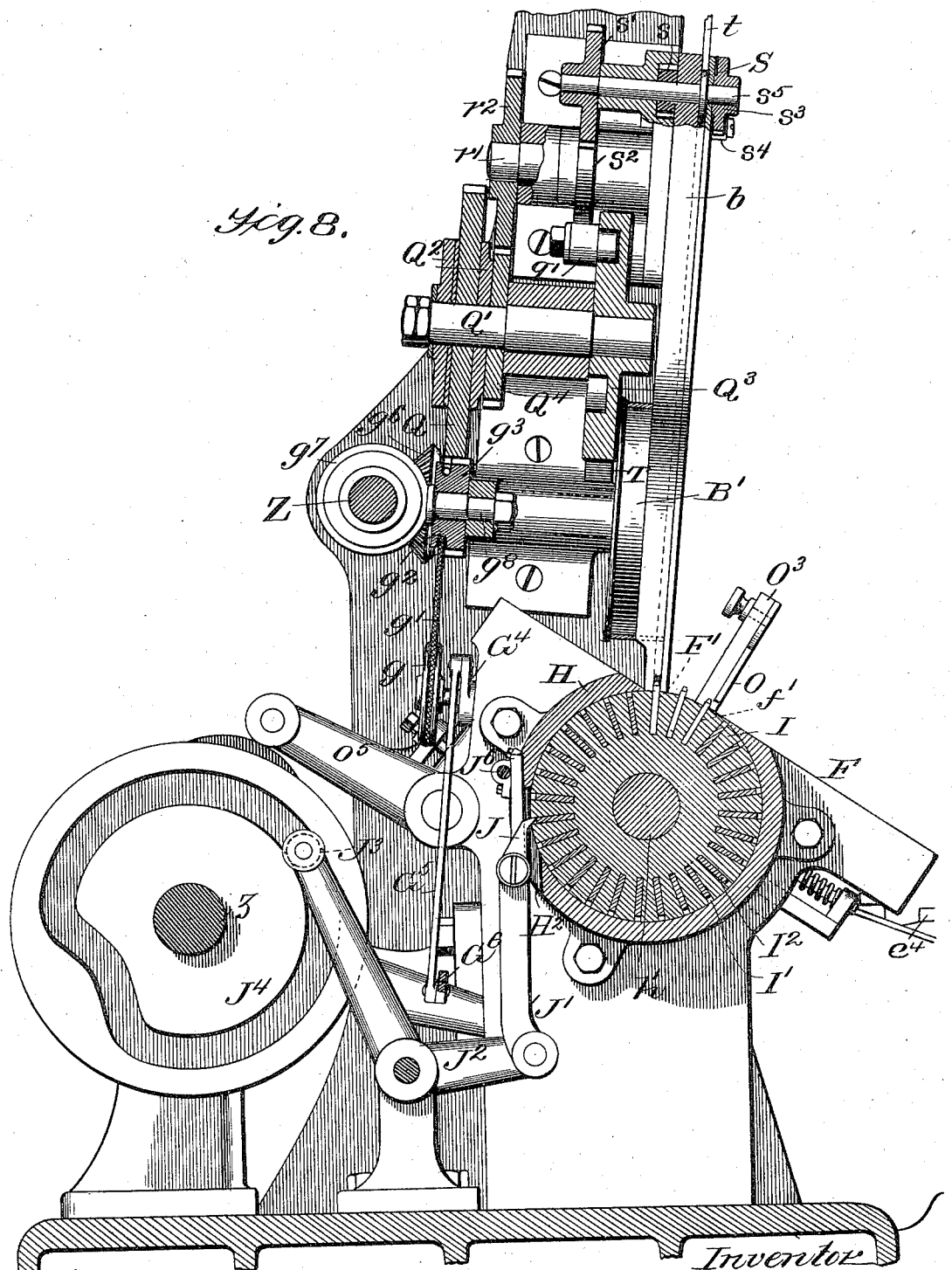

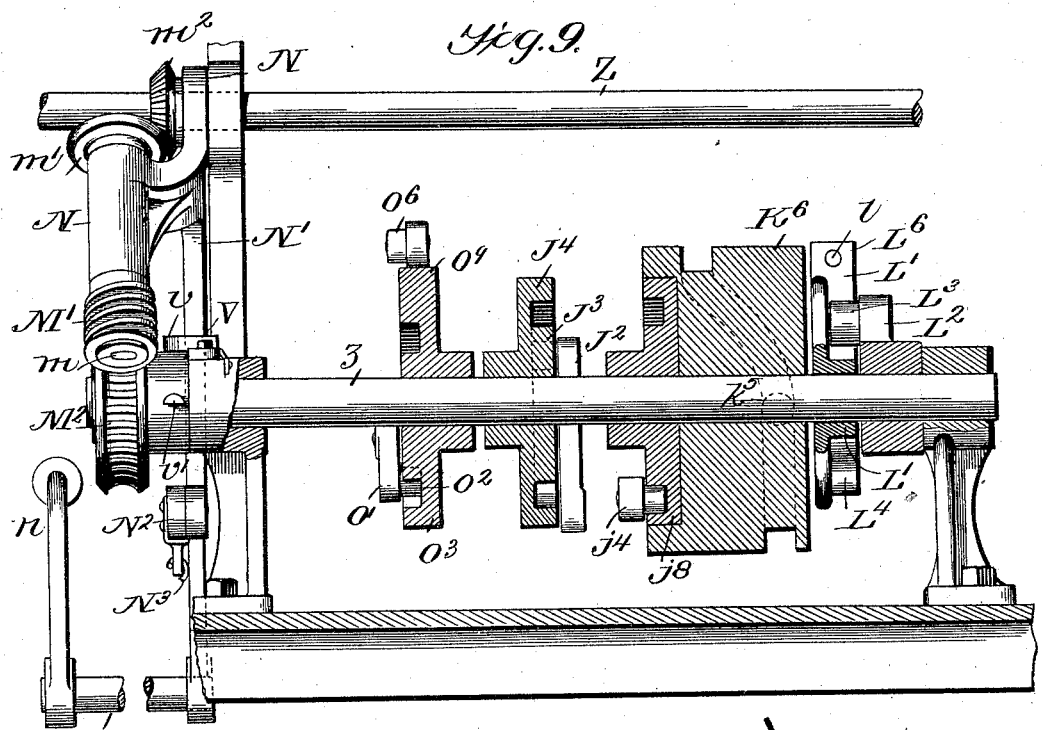
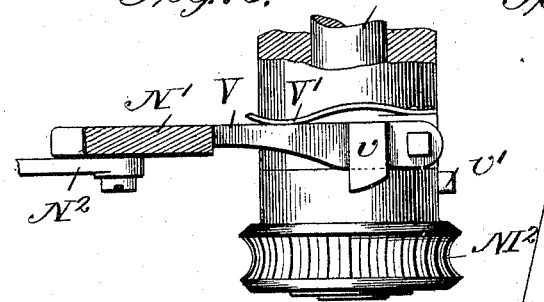
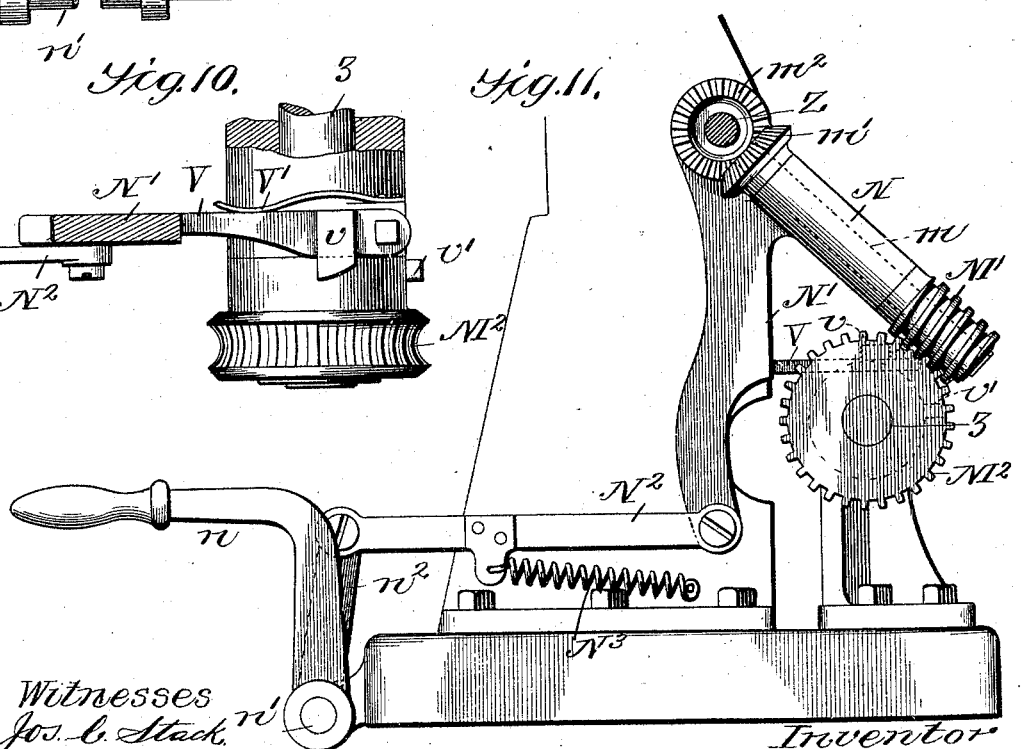

(No Model.)
10 Sheets—Sheet 8.
P. F. COX.
TYPE SETTING MACHINE.
No. 581,954. Patented May 4, 1897.
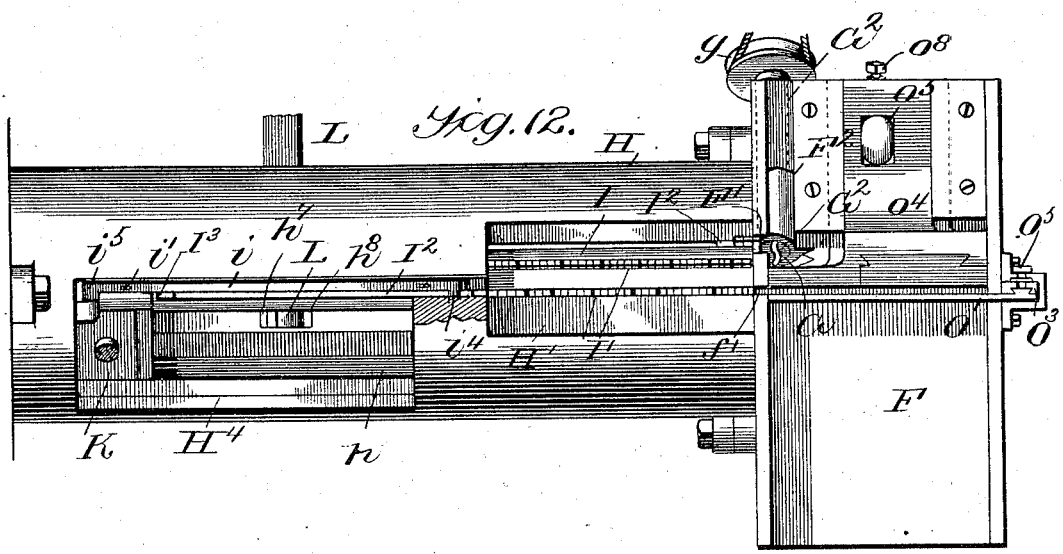
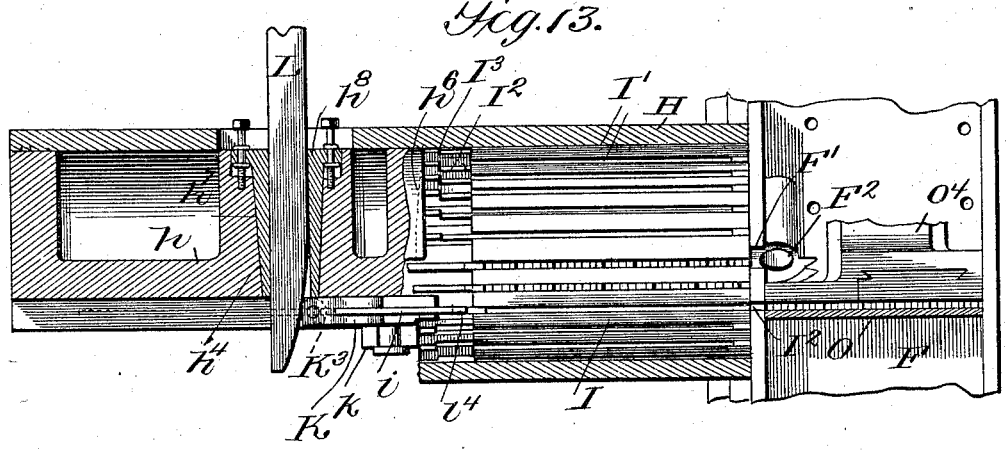
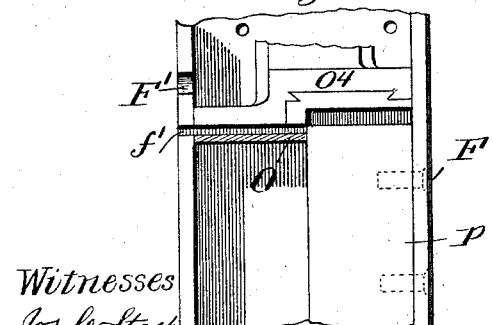
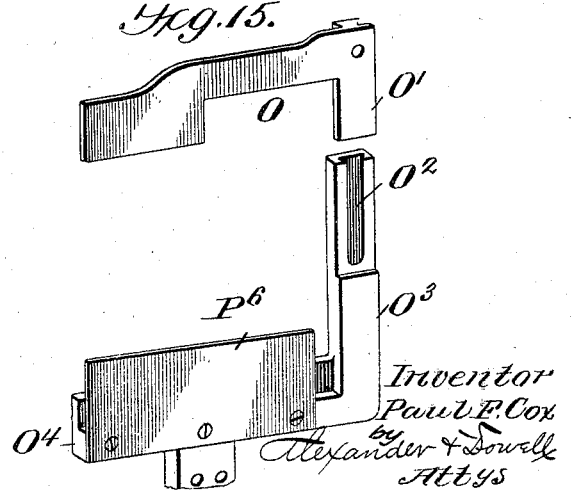
Witnesses
Jos. C. Stack
James R. Mansfield
Inventor
Paul F. Cox
by Alexander & Dowell
Attys (No Model.) 10 Sheets—Sheet 9.
P. F. COX.
TYPE SETTING MACHINE.
No. 581,954. Patented May 4, 1897.
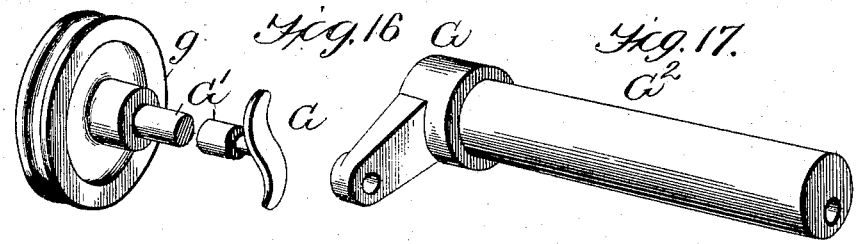
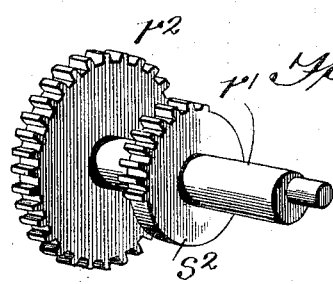
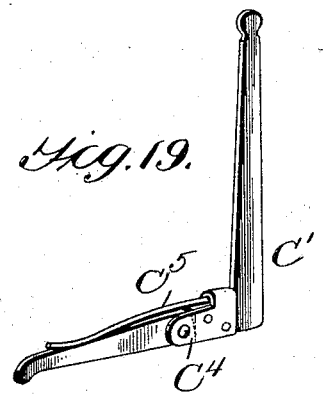
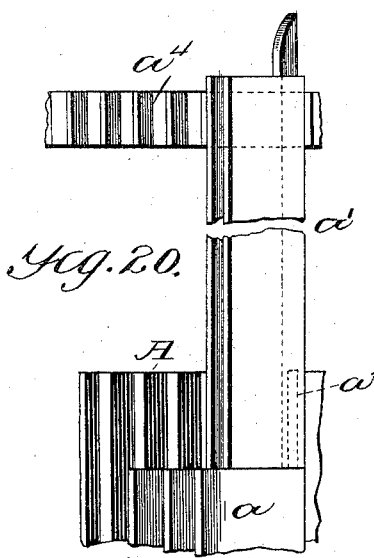
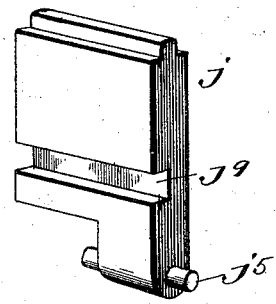
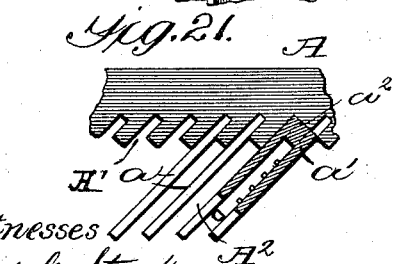
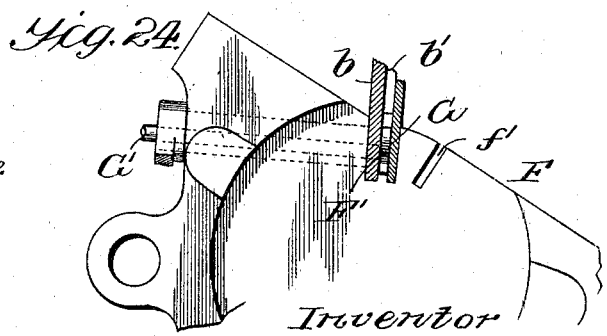
Witnesses
Jos. L. Stack
James R. Mansfield
Inventor
Paul F. Cox
by Alexander & Dowell
Attys (No Model.) 10 Sheets—Sheet 10.

P. F. COX.
TYPE SETTING MACHINE.

No. 581,954. Patented May 4, 1897.

Witnesses
Jos. C. Stack
James R. Mansfield

INVENTOR
Paul F. Cox.
by Alexander & Dowell
Attorneys

UNITED STATES PATENT OFFICE.

PAUL FLEMMING COX, OF CHICAGO, ILLINOIS, ASSIGNOR TO THE COX TYPE SETTING MACHINE COMPANY, OF SAME PLACE.

TYPE-SETTING MACHINE.

SPECIFICATION forming part of Letters Patent No. 581,954, dated May 4, 1897.

Application filed June 20, 1896. Serial No. 596,312. (No model.)

*To all whom it may concern:*

Be it known that I, PAUL FLEMMING COX, of Chicago, in the county of Cook and State of Illinois, have invented certain new and useful Improvements in Type-Setting Machines; and I hereby declare that the following is a full, clear, and exact description thereof, reference being had to the accompanying drawings, which form part of this specification.

This invention relates to type-setting machinery, and is an improvement upon the machines described in my Letters Patent of the United States Nos. 528,855, 528,856, and 528,857, dated November 6, 1894; No. 534,550, dated February 19, 1895, and No. 550,554, dated November 26, 1895.

The objects of the present invention are, first, to simplify and improve the type-reservoir to prevent choking of the type-ejecting mechanism; second, to provide an improved positively-acting ejector mechanism controlled by keyed trips; third, to provide improved means whereby, while the types are or may be continuously composed, lines of type can be separated, automatically justified, and forwarded into the "galley;" fourth, to provide improved means for producing yielding spaces as needed; fifth, to combine all these mechanisms in a compact, simple, and efficient machine the operations of which will always be visible and entirely under the control of one operator.

The invention therefore consists in the novel constructions and combinations of devices for accomplishing the above objects, substantially as illustrated in the accompanying drawings and hereinafter described.

The claims concluding this specification set forth clearly what I desire to protect by this patent.

The accompanying drawings illustrate the improved machine, in which—

Figure 6:
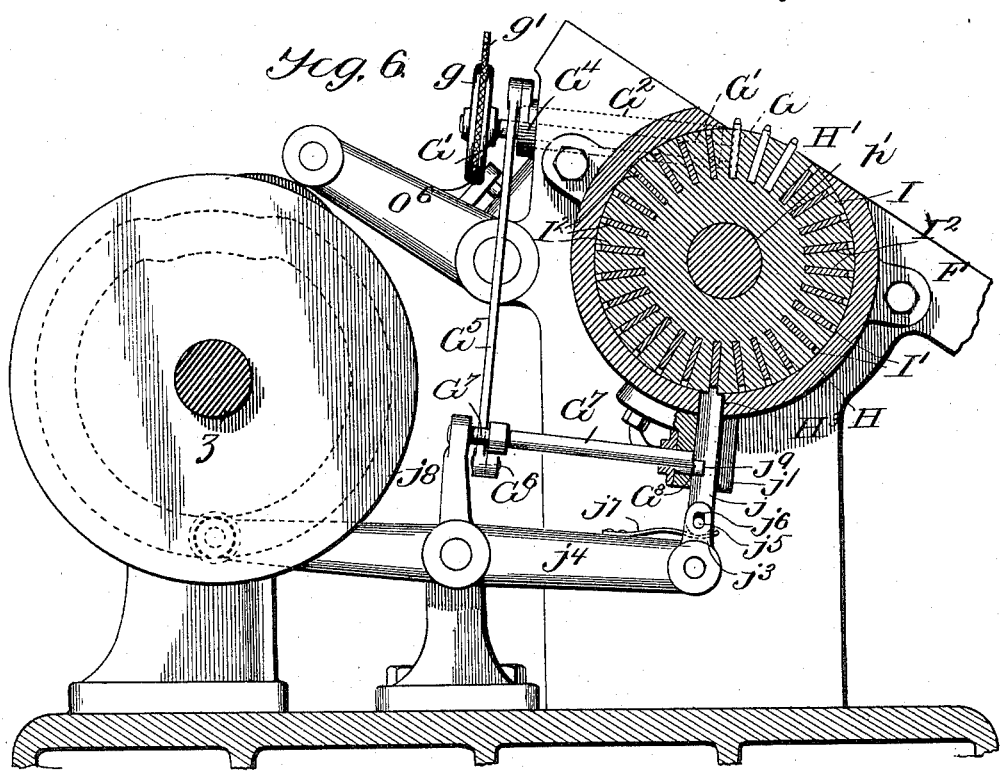
Figure 7:
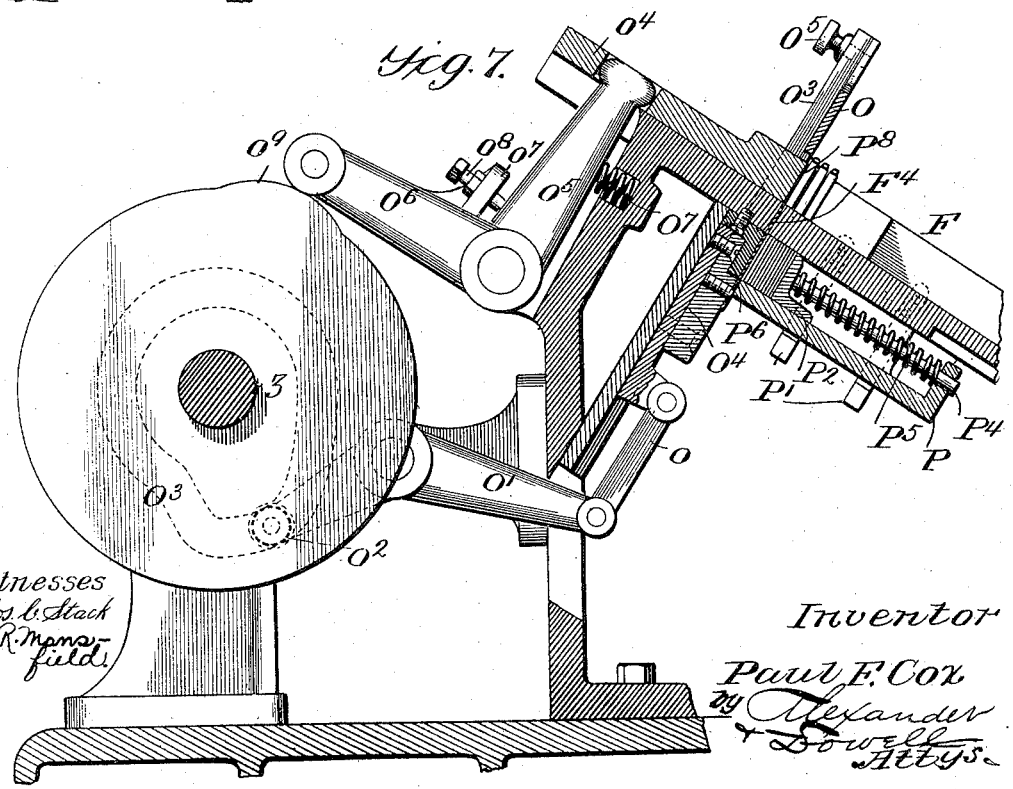
Figure 25:
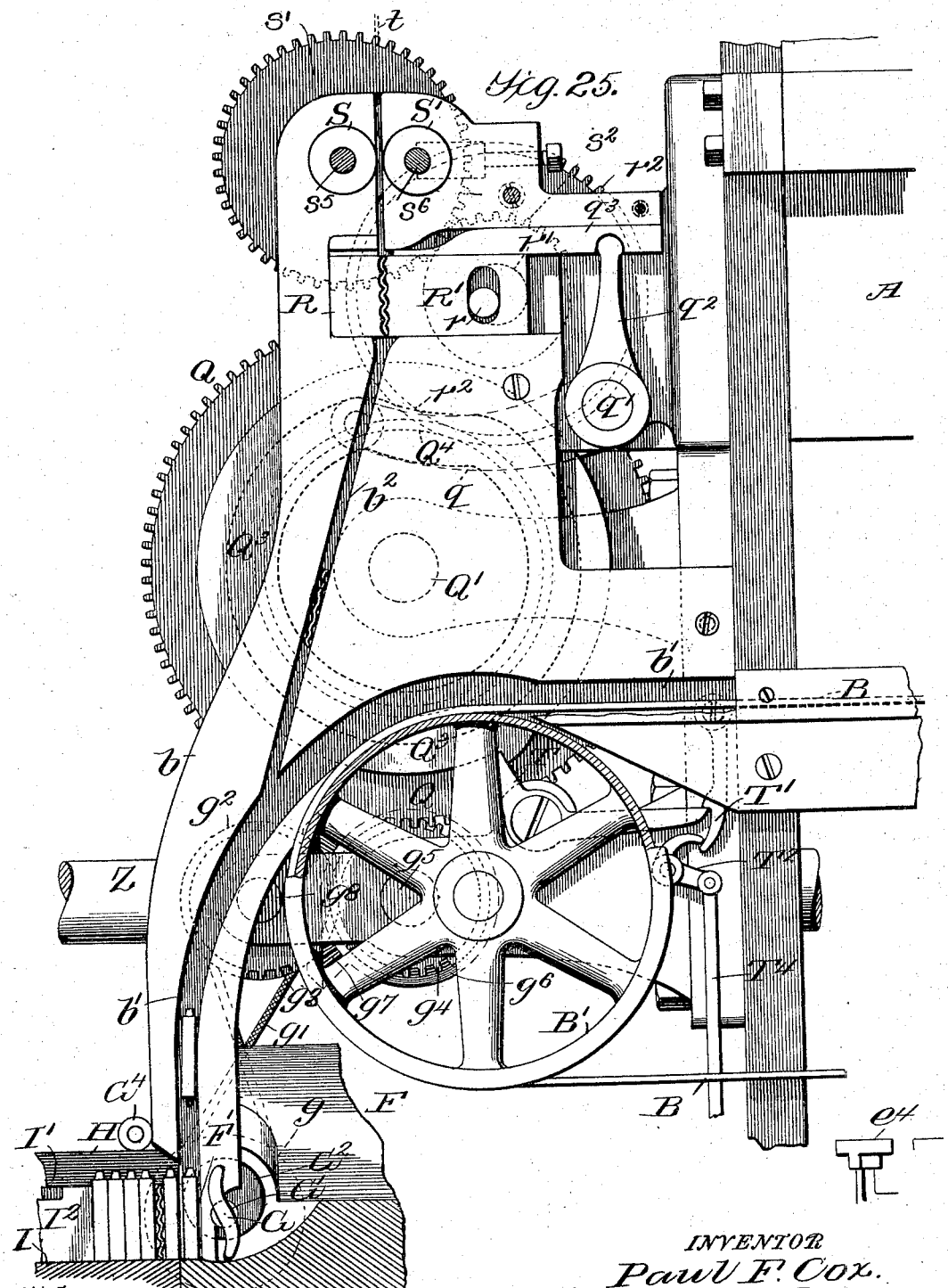

Figure 1 is a front view of the complete type-setting machine. Fig. 2 is an enlarged front view of the space-making and line-justifying mechanisms. Fig. 3 is a detail vertical section of the type-ejecting mechanism, showing the retractor in position to prevent the ejection of a type. Fig. 4 is a similar view, in detail, showing the retractor released. Fig. 5 is an enlarged transverse section through the justifying devices, showing the wedge-operating devices. Fig. 6 is a section view through the justifying mechanisms, showing the type-line-receiver locking mechanism. Fig. 7 is a detail sectional view showing the galley, rule, and plunger and lead operating devices. Fig. 8 is an enlarged vertical sectional view through the space-making mechanism and showing the type-line-receiver rotating mechanism. Fig. 9 is a detail sectional view of the cam on shaft $z$ and view of the mechanism for rotating said shaft. Fig. 10 is a detail of the worm-releasing mechanism. Fig. 11 is an end view of the mechanism for driving shaft $z$. Fig. 12 is a top view of the justifying mechanism and type-line-handling devices. Fig. 13 is a similar view with the casing in section and showing the wedge-adjusting devices. Fig. 14 is a detail view of the galley, illustrating how it can be narrowed. Fig. 15 is a detail view of frame $O^4$ and of a rule suitable for use as shown in Fig. 14. Figs. 16 and 17 are detail views of the type-pusher and its eccentric mountings detached. Fig. 18 is a detached view of the segmental gear and eccentric shaft $r'$ of the space-making mechanism. Fig. 19 is a detached view of one of the ejector-levers. Figs. 20 and 21 are detail views illustrating the construction of the type-reservoir and the detachable type-line holders. Figs. 22 and 23 are detail views of the type-line-receiver lock of the rock-shaft $G^7$. Fig. 24 is a detail view of the galley-casting F and the pusher G and its connections. Fig. 25 is an enlarged front elevation of the space-making mechanism and type-composing mechanism.

The general arrangement and location of the type-reservoir, type-carrier, type-composing mechanism, type-justifying mechanism, type-galley, and space-making mechanism are similar to those indicated in my Patent No. 534,550 above mentioned.

For convenience I will describe the improvements in the mechanisms successively.

*The Type-Reservoir.*

The type-reservoir consists of a substantially vertical plate A, which may, for convenience of construction, be made in several vertical sections firmly united. In the rear face of this plate are a series of parallel vertical grooves A', which are just the thickness (flatwise) of a type apart, about a quarter of an inch deep, and are diagonal to the face of the plate. In these grooves are secured metal strips $a$, as shown, which constitute, with the plate, the type-channels $A^2$. The strips $a$ are about an inch shorter than plate A, so that type-holders $a'$ can be set on top of each type-channel and thus the latter be easily filled. The type-holders $a'$ have their lower ends slotted, as at $a^2$, so that they can be fitted into the upper ends of grooves A' directly over the strips $a$, and thus register exactly with the channels, as indicated in Fig. 20. These type-holders are filled in the distributer and then placed over the proper type-channels and their contents delivered thereto. The upper ends of the type-holders during this transfer may rest against a supporting-bar $a^4$, attached to the top of the type-reservoir, as indicated in Fig. 20.

The plate A is secured between the end uprights of the frame in a slightly forwardly-inclined position, (see Fig. 3,) with the strips $a$ at the rear, and the types descend heads backward in the channels and are ejected butts first through suitable grooves in the lower edge of plate A onto the carrier-belt B, running horizontally in front of said plate, as described in my aforesaid patent.

In order to prevent the type-ejectors C from pulling types backward with them, I place a guard-plate $b^6$ at the back and lower ends of the type-channels, (see Fig. 3,) the lower edge of this plate being notched opposite each type-channel to correspond to the thickness of the types in such channel, so that while the ejectors can work easily under the guard-plate no types can be pulled backward out of the channel. This is practically a very beneficial and important feature of the machine.

*The Type-Ejecting Mechanism.*

The type-ejectors C are constructed substantially as described in my Patent No. 528,856 aforesaid, and operated by bell-crank levers C' and push-rods $C^2$ and rotating dogs $d$, substantially as described in my Patent No. 528,855 aforesaid, or as in my Patent No. 550,554 aforesaid. Each bell-crank lever C', however, is retracted by a spring $c$, attached to an adjusting-screw $c'$, tapped through a casting $c^3$, attached to the frame, as shown in Fig. 3, so that each can be properly and independently adjusted. The dogs $d$ are mounted in radial sockets in a rotating shaft D and are normally projected by springs $d'$, so as to uplift the push-rods unless retracted. Instead of the retractor shown in my Patent No. 528,855 I show pivoted retractors D', arranged so that when upheld close to the shaft, as shown in Fig. 3, the dogs $d$ will strike on their edge and be retracted or forced back into their sockets in shaft D and thus kept from actuating the push-rods; but when the retractors are dropped, as indicated in Fig. 4, the dogs are not retracted and consequently lift the push-rods, thereby ejecting a type.

A retractor D' is pivoted vertically below each push-rod and is curved on its edge adjoining the shaft D, so that it can be turned up close thereagainst, and then act as a cam to force the dog or dogs inward. In the upper edge of each retractor is a notch $D^2$, in which hangs the lower end of an oscillating lever E, pivoted on a suitable support directly above the retractor, lever E being constructed and operating substantially as "lever G" in my Patent No. 528,855 aforesaid. Each retractor is normally held near to the shaft D (so as to prevent the dogs operating the relative push-rod) by means of a catch $e$, pivoted behind the retractor and adapted to engage a shoulder $D^3$ on the rear edge of the retractor and lock it in its forward position, Fig. 3. Each catch is connected to a suitably-lettered key in such manner that upon depressing a key the corresponding type-ejecting mechanism will operate and eject a type. As shown, each catch is connected by a rod $e'$ to a bell-crank $e^2$, pivoted on a suitable support and in turn connected by a rod $e^3$ to an oscillating key-piece $e^4$, loosely pivoted on a horizontal rod $e^5$ beneath the bank of keys. Each key-piece is returned to normal position by a spring $e^6$, which is hooked around the short arm of the lever, and its other end is fast to an adjustable collar $e^7$, secured on rod $e^5$ by a set-screw, as indicated in Fig. 3. Upon slightly depressing a key the catch will be disengaged from the retractor. Thereupon the rotating dog $d$, striking the retractor, will push it back out of the way, and the dog will strike and uplift the push-rod which operates the ejector and the proper type is delivered onto the belt. The backward movement of the retractor, however, rocks the corresponding lever E, so that its upper end is moved toward the push-rod, and as the push-rod rises a lug $C^3$ thereon strikes the upper end of lever G and pushes it back, thereby rocking said lever and causing its lower end to rock the retractor back toward the shaft, and catch $e$ locks it in such position until the key is again depressed, this action being substantially instantaneous, so that but one type is ejected for each touch of a key. Holding a key down will allow more than one type to be ejected. If desired, the retractors could be provided with springs to draw them away from the shaft D when the catch releases them.

The shaft D is driven continuously from the main drive-shaft Z (which lies just below and in rear of the type-reservoirs) by a train of gears Z', as indicated in the drawings, Fig. 3.

The sockets for the dogs $d$ are preferably arranged in rows longitudinally of the shaft, said rows being preferably twisted spirally of the shaft, so that there will always be some of the dogs pressing against the retractors, and thus a substantially even resistance or braking effect be maintained against the rotation of shaft D.

In order to prevent breakage, if by accident a type should catch while being ejected, so that the ejector could not make the proper stroke, the bell-crank levers C' might be constructed as shown in Fig. 19—i. e., the horizontal arm is pivoted to the vertical arm, as at C⁴, but is held at right angles thereto by a spring C⁵, which is made stiff enough to cause the lever to operate the ejector under normal conditions, but in case the ejector is jammed by a misplaced type then the spring would yield and breakage of parts be prevented.

The Type-Composing Mechanism.

The belt B runs over pulleys B' B² at opposite ends of the machine and is arranged and operated substantially as described in my Patent No. 528,556, except that instead of driving the left-hand pulley B', I drive the right-hand pulley B² by means of shaft B³ and bevel-gearing B⁴ B⁵ from the main shaft Z. This enables me to change the gears to vary the speed of the belt without thereby varying the speed of the justifying mechanism.

The belt B delivers the type into a channel b' in the lower end of plate b, attached to the left-hand side of the type-reservoir, over and depending partly around wheel B', substantially like plate "Q" in my Patent No. 534,550. This channel b' directs the type into a slot F' in the side of the receiving-galley stand F, from which the types are immediately pushed by a rotary "pusher" G into a channel of the "receiver" hereinafter described. This pusher is mounted on a shaft G', which is journaled eccentrically of and in a rock-sleeve G², mounted in a cylindrical bore F² in stand F. On the rear end of shaft G' is a pulley g, driven by a belt g' from a pulley g² on a stub-shaft g⁴, attached to a bracket in rear of plate b and above the stand F. Pulley g² is attached to or formed with a pinion g³, which meshes with a pinion g⁴ on another stub-shaft g⁵, suitably mounted in a bracket beside pulley g³ and provided with a bevel-gear g⁶, meshing with a bevel-gear g⁷ on main shaft Z. (See Figs. 8 and 25.) By this means the pusher is continuously rotated during the operation of the machine. The object of mounting shaft G' in a rocking sleeve will be hereinafter explained.

The Line Shifting and Justifying Mechanism.

This is constructed much like that described in my Patent No. 534,550, which will assist in enabling the present improvements to be understood.

To the left-hand side of stand F is attached one end of a cylindrical casing H, within which is a guide-casting h, having a stub-shaft h' attached to its right-hand end, on which shaft is journaled the rotary type-line receiver I, having a number of longitudinal radial type-receiving channels I' in its periphery, which are adapted to first register with the slot F" in stand F, so that the pusher G can force the type therein, and afterward to register with another slot f' in the side of the galley to allow the justified line of type to be moved from the receiver into the galley, as hereinafter described.

The casing H is slotted, as at H', over the rotary receiver I, so that about three channels I' will be visible always—to wit, those registering with slots F' and f and the intermediate channel.

The casing H is stationary, but the receiver is rotated intermittently, so as to move its channels successively into register with channel F' by means of a pawl J on a vertical rod J', pivoted at its lower end to the front end of an oscillating lever J², having a roller J³ on its rear end engaging a groove in a cam J⁴, mounted on a shaft z in rear of the casing. (See Fig. 8.) The upper end of rod J is guided by a loop J⁶, attached to the rear side of casing H, and pawl J works through a slot H² in the casing and engages with the channels I' of receiver I, as indicated in the drawings.

The receiver is locked, except at the moment of rotation, by means of a bolt j, guided in a block j', attached to the under side of casing H, bolt j working through a slot H³ in said casing. Said bolt is connected to a short link j³ on the front end of an oscillating lever j⁴ by means of a pin j⁵, working in slots j⁶ in the link, so that the bolt j has a slight longitudinal play independent of the link and lever, or vice versa, so that the bolt will not be jammed nor bind the receiver if it should be moved upward before the receiver is in correct registering position. A spring j⁷ is attached to lever j⁴, so as to push bolt j upward. On the rear end of lever j⁴ is a friction-roller engaging a groove in a cam j⁸ on shaft z. (See Fig. 6.)

In each channel of receiver I is a plunger or follower-plate I², which is longer than the receiver and projects beyond the left-hand end thereof. These follower-plates are pushed back out of the slots by the incoming type, and after enough type for a line is received in a channel the receiver is turned to bring an empty slot into position to receive the type, and substantially when the channel containing the previously-composed line of type is brought into register with the galley-entrance slot f the plunger in said channel is moved forward to forcing the line out into the galley and justifying it by lineal compression, as described in my aforesaid Patent No. 534,550. The plunger is thus moved by means of a movable slide K.

On the forward side of casting h is a dovetailed groove h², which forms a guideway for a reciprocating slide K, which has a dovetailed flange engaging said groove, so that the block can be slid back and forth on casting h within casing H, which has an opening H⁴ in its side to admit this movement of the slide. The slide is reciprocated by means of a lever $k$ on a rock-shaft $k'$, which has a crank-arm $k^2$ on its rear end connected by a link $k^3$ to a pivoted lever $k^4$, having a friction-roller $k^5$ on its end engaging a drunken groove in a cam $k^6$ on shaft $z$, as shown. When the slide K has nearly completed its stroke, ejecting the type from the channels, it passes a wedge L, lying in a transverse guideway $h^4$ in casting $h$ and projecting through an opening in the rear side of casing H. This wedge is connected at its rear end to a yoke L', horizontally straddling shaft $z$ beside a cam-arm $L^2$ thereon, which cam-arm has a friction-roller $L^3$ on its end adapted to engage a cam-flange $L^4$ on the side of yoke L and force the yoke and wedge forward. (See Figs. 5 and 13.) The yoke is pushed rearward and the bolt retracted by means of a spring $l$ on a rod $l'$, projecting from the rear side of casing H through an opening in a stud $L^6$ on the yoke, as shown in Fig. 6. The lower end of flange $L^4$ is curved forward, as at $L^5$, so as to render the return movement of the yoke and wedge more gradual. Just as slide K passes to the right of the wedge the latter is moved outward, and its beveled end engages the rear edge of the slide and forces it to complete its stroke with great power. The slide may have a friction-roller $K^3$ in its edge for the engagement of the wedge.

The sides of the slot $h^5$ in casting $h$ are made divergent, and opposite adjustable tapered blocks $h^7 h^8$ are placed therein on opposite sides of wedge L. By shifting these blocks the position of the wedge can be adjusted laterally sufficiently to enable the compression of the lines to be made with the greatest nicety. The adjustable wedge-blocks, while useful for purposes stated, are not indispensable. I prefer to employ this wedge, because it is very simple and powerful and relieves the slide-actuating levers of the strain to which they would be subjected in order to compress the lines needful in justifying them. This pressure is so great that unless the levers and cams were made heavier than is desirable they would eventually spring or become displaced and the exact and equal justification destroyed.

In order to get the justified lines wholly into the galley, it is necessary that the ends of plungers $I^2$ be pushed into slot $f$, so that the line of type will be wholly moved into the galley. It then becomes necessary to retract the plunger $I^2$ out of slot $f$ in order that the receiver can be rotated. I accomplish this as follows: To the upper edge of the opening $H^4$ in casing H, I attach a retractor-plate $i$ by means of screws $i'$ passing through slots $i^2$ in the retractor $i$, so that the latter has a certain limited play. This retractor extends beyond the end of opening $H^4$ into a slot $H^5$ in the casing and has a depending tooth $i^4$ on its front end. The retractor $i$ is fixed in such position that when a plunger $I^2$ is moved with a line of unjustified type in position to register with slot $f$ in the galley the plunger underlies the tooth $i$ of the retractor, and when the plunger is forced to the right, so as to eject the line of justified type into the galley, a tooth $I^3$ on the outer edge and rear end of the plunger engages with tooth $i^4$ of the retractor, and the latter is pulled slightly forward by the plunger. Then slide K, just before reaching its normal position at the left of casing, strikes a tooth $i^5$ on the rear end of the retractor and draws the latter backward and with it the plunger which has just ejected a line into the galley. This operation is repeated for each plunger, the tooth $i^4$ of the retractor lying in such position that it will always engage the tooth $I^3$ of any plunger in register with slot $f$. Of course the plungers are thus retracted from slot $f$ prior to the action of the receiver-rotating devices.

I may further add that the plungers are brought to proper position in the channels I' prior to the registry of the channels with slot $F^2$ by means of the annular cam-surface $h^6$ on the inner end of casting $h$, substantially as in my Patent No. 534,550.

The pusher G pushes the types one by one into the channels of the receiver successively through the slot F', and as the ends of the pusher project slightly into the channels the receiver might be locked by the pusher or the pusher damaged if the pusher were in rigid bearings; but by placing it in the rocking bearing $G^2$, I am enabled to move it back out of the way simultaneously with the unlocking of the receiver and to return it to normal position simultaneously with the locking of the receiver by the following means:

To the rear end of bushing $G^2$ is attached a short arm $G^4$, connected by a rod $G^5$ to an arm $G^6$ on a rock-shaft $G^7$, which has an eccentric pin $G^8$ on its other end engaging a slot $j^9$ in bolt $j$, so that the bushing $G^2$ will be rocked simultaneously with and by the vertical vibration of bolt $j$, and as the bushing is rocked shaft G' and pusher G are moved bodily toward or from the receiver, and thus the pusher is moved so it cannot interfere with the rotation of the receiver.

The shaft $z$ is rotated once after each line of type is composed by the following means: On the right-hand end of shaft $z$ is a worm-gear $M^2$, which is intermittently engaged at the will of the operator with a worm M' on the end of a stub-shaft $m$, journaled in a hanger-casting N, suspended on and from shaft $z$, as shown in Figs. 9 and 11, shaft $m$ having a bevel-gear $m'$ on its upper end meshing with a bevel-gear $m^2$ on shaft $z$, so that worm M' is continuously rotated when the machine is in operation. By swinging hanger N, however, the worm can be thrown into or out of mesh with gear $M^2$. From hanger N depends an arm $N^7$, which is connected by a bar $N^2$ to a crank-arm $n^2$ on the end of a horizontal rock-shaft $n'$, underlying the keyboard and having on its right-hand end a hand-lever $n$. (See Figs. 9 and 11.) A spring $N^3$ is arranged so as to pull bar $N^2$ rearward and thereby swing hanger N so as to throw worm $M'$ out of engagement with the gear $M^2$ until lever $n$ is depressed. As it is necessary that shaft $z$ make a complete revolution every time a line is to be justified, and in order to relieve the operator of the necessity of holding down lever $n$ during the justification of a line, a latch V is pivoted on a suitable support above shaft $z$ and in rear of arm $N'$ in such position that when hanger N is swung forward so as to throw worm $M'$ into engagement with gear $M^2$ a spring $V'$ turns the latch behind the arm $N'$ and locks it, (see Figs. 9 and 10,) thus keeping worm $M'$ engaged with gear $M^2$. The latch has a beveled lug $v$ on its side overlying the hub of gear $M^2$ when the latch locks the arm $N'$, and a stud $v'$ is attached to the hub in position to contact the beveled edge of lug $v$ and force the latter to one side, thereby disengaging latch V from arm $N'$ and allowing spring $N^3$ to swing the hanger N rearward, thus throwing worm $M'$ out of engagement with gear $M^2$. The stud $v'$ just clears lug $a^2$ as the latch V disengages arm $N'$. Consequently when lever $n$ is again depressed the latch locks arm $N'$, and shaft $z$ makes a complete revolution before the pin $v'$ disengages latch $v$ from arm $N'$.

The types entering the galley through slot $f$ pass between a vertically-movable rule O and a plunger $o^4$. The rule is a metal blade of length corresponding to the width of galley, or, rather, to the width of the line to be composed, (the machine having interchangeable rules of different lengths,) having a shank $O'$ on one end adapted to fit into a corresponding slot $O^2$ in the upper end of the side bar $O^3$ of a vertically-movable frame $O^4$, (see Figs. 7 and 15,) the rule being fastened by a thumb-screw $O^5$. Frame $O^4$ is mounted on the stand F below the galley proper and is reciprocated up and down by means of links $o$, connected to the front end of a bell-crank lever $o'$, the rear end of which has a friction-roller $o^2$ engaging a groove in a cam $o^3$ on shaft $z$, as shown, so that the rule is raised and lowered once for each rotation of shaft $z$.

Plunger $o^4$ is drawn up in the galley by means of a spring $O^7$ and is pushed down in the galley by means of an arm $o^5$ and a lever $o^6$, which has a stud $o^7$, through which is tapped a bolt $o^8$, that impinges against arm $o^5$, so that the amount of movement of arm $o^5$ can be nicely regulated, the lever $o^6$ having a friction-roller on its rear end bearing upon the periphery of cam $o^3$ and operated at the proper time by a lobe $o^9$ on said cam, as indicated in the drawings.

*Means for Leading the Composed and Justified Type.*

Beneath galley F and in front of frame $O^4$ is detachably secured a lead-box P, resting at one side in a rabbet in the stand and at the other side supported by spring-catches $P'$, attached to side of galley, as shown in Fig. 7. Within this lead-box is a plunger $P^2$, pressed toward frame $O^4$ by a spring $P^5$ on a rod $P^4$, arranged as shown in Fig. 7. The leads are placed in the box in front of the plunger and are successively lifted into the galley through a transverse slot $F^4$ therein, directly in line with slot $f$, by means of a plate $P^6$, attached to frame $O^4$.

The operation is briefly as follows: Plunger $o^4$ being retracted, rule O is lowered into the galley. Then the line of type is pushed into the galley through slot $f$, between rule O and plunger $o^4$, between the rule and the set matter in the galley. Then rule O rises, and simultaneously plate $P^6$ lifts a lead $P^8$ up through the slot in the bottom of galley behind the line of type just entered, and then plunger $o^4$ moves the lead and justified line down against the previously-composed matter and retracts out of the way of the rule, which descends ready for the entrance of another line.

An important feature of my present invention is that I can set and justify lines of any desired length, from thirteen ems to twenty-six ems, or more, by the same mechanism simply by varying the width of the galley and changing the leads and rules. For example, suppose the machine, as shown in Figs. 1, 2, and 12, is adapted to set lines twenty-six ems in length and it is desired to make the lines thirteen ems in length. To do this (see Figs. 14 and 15) a filling-piece $p$ is placed in the galley below the slot $F^4$, which will narrow its width thirteen ems, the twenty-six-em rule is detached and replaced by a thirteen-em rule, the rules being interchangeable, and thirteen-em leads are placed in box P. The operation of the machine will then proceed exactly as if twenty-six-em lines were being justified, except, of course, that the justifying mechanism will operate twice as often as when setting twenty-six-em lines.

*The Space-Making Mechanism.*

In rear of plate $b$ and above and meshing with pinion $g^4$ is a gear Q, loosely mounted on a shaft $Q'$ between friction-disks $Q^2$, keyed on said shaft and embracing the gear. On the front end of the shaft $Q'$, just behind plate B, is keyed a disk $Q^3$, having a cam-groove engaging a roller on the end of an arm $q$, attached to a stub-shaft $q'$, journaled in a bracket in the rear of plate $b$ and having on its front end an upstanding arm $q^2$, which engages a notch in the under side of a horizontal cutter $q^3$, lying in a horizontal groove in the face of plate $b$, near the upper end thereof.

Near and just below the cutting edge of cutter $q^3$ is a pair of crimping-jaws R $R'$, also placed in a recess of plate $b$, the former jaw being stationary and the latter movable toward or from the former, being operated by means of an eccentric pin $r$ on the front end of a stub-shaft $r'$, which is journaled in a suitable support above shaft Q' and is driven by means of a pinion $r^2$ meshing with a pinion $Q^4$, fast to shaft Q'. Just above the crimpers is a pair of feed-rolls S S', lying in recesses in the front face of plate $b$ and mounted on stub-shafts $s^5$ $s^6$, as shown, these stub-shafts having intermeshing gears $s$ to compel them to rotate together, and on the rear end of stub-shaft $s^5$ is a pinion $s'$, which is meshed by a segmental gear $s^2$ on shaft $r'$, as shown in Figs. 8 and 25. On the front end of stub-shaft $s^5$, which projects through plate $b$, is a notched disk $s^3$, which is engaged by a spring-pressed dog $s^4$, pivoted on the plate $b$, the dog being adapted to lock shaft $s$ and prevent backlash thereof when the segmental gear disengages pinion $s'$, thereby holding pinion $s'$ in position to be properly reëngaged by the segment. By this means the feed-rolls are operated intermittently.

The gear Q is rotated continuously during the operation of the machine, but shaft Q' is locked, except when it is desired to make a space, by means of a catch T, pivoted behind plate $b$ and engaging a lug on the periphery of disk $Q^3$. This catch in turn is controlled by a swinging pawl T', which can be disengaged from the catch by means of a trip $T^2$, pivoted on the frame and connected by a rod $T^4$ to an arm $T^5$ on a rock-shaft $T^7$, which supports the space-bar $T^8$ by means of arms $T^9$. Thus by depressing the space-bar the space-making mechanism is released and shaft Q' makes a revolution.

The feed-rolls S S' feed in the proper length of lead ribbon $t$ to make a space at each partial rotation thereof, the ribbon being drawn from a spool $t'$, supported on a bracket $t^2$ above the feed-rolls, and the spool being tensioned, if desired, so as to prevent its revolving by momentum. The ribbon is fed by the rolls in front of cutter $q^3$ down between the crimpers, and when the feed-rolls stop the cutter is moved and severs the blank, which is simultaneously caught between and crimped by the jaws R R', and is subsequently released and drops into a channel $b^2$ in plate $b$, by which it is directed into the lower end of channel $b'$ and thence into slot F' in front of pusher G, like the type. The parts are so timed, however, that the crimping-jaws stop moving just before they would wholly release the crimped space. Consequently a complete space is always hanging in the crimpers ready for instant delivery, so that the moment the space-bar is touched and the shaft Q' commences to revolve a space is delivered in front of the pusher, while a fresh space is formed and held ready for instant delivery the next time the space-bar is touched.

The sliding crimpers are preferable to rotary ones, for they make every space exactly alike, where I found rotary crimpers were apt to vary the spaces somewhat.

Having thus described my invention, what I therefore claim as new, and desire to secure by Letters Patent thereon, is—

1. In a type-setting machine, the combination of the type-reservoir having slots as A' in its upper end; with the removable type-holders $a'$ having their lower ends slotted as at $a^2$, whereby the holders are adapted to fit the upper ends of slots A', for the purpose and substantially as described.

2. The combination of an oscillating key-piece, the supporting-rod, the adjustable collar $e^7$ on the rod, and the spring $e^6$ connected to said collar and engaging the key-piece, substantially as and for the purpose described.

3. The combination with the type ejecting and forwarding mechanism of a type-setting machine; of a rotary pusher, and a rocking journal or sleeve, in which the pusher-shaft is eccentrically mounted, for the purpose and substantially as described.

4. The combination with the type-forwarding mechanism of a type-setting machine, and the type-line receiver into which the types as composed are forwarded; with a rotary pusher for forwarding type into said receiver, and mechanism substantially as described, for moving said pusher automatically toward or from the receiver, substantially as and for the purpose described.

5. In a type-setting machine, the combination of type ejecting and forwarding mechanism; and a movable type-line receiver into which the types are forwarded as composed; with the rotary pusher, the eccentric bearings for the pusher-shaft and means whereby upon the completion of a line said bearings are rocked so as to move the pusher out of the way while the receiver is shifted, substantially as and for the purpose set forth.

6. The combination of the type-forwarding mechanism, a rotary receiver having type-receiving channels; a rotary pusher for forwarding types into said channels; a rocking sleeve in which the shaft of the pusher is journaled, and means whereby the sleeve is rocked so as to move the pusher away from the receiver prior to the rotation thereof, for the purpose and substantially as described.

7. The combination of the galley, the rotary channeled type-line receiver, mechanism for rotating said receiver, mechanism for locking it; a rotary pusher having its shaft eccentrically journaled in a rocking sleeve, and connections substantially as described whereby the sleeve is rocked simultaneously with the locking and unlocking of the receiver, for the purpose and substantially as described.

8. The combination of the sleeve $G^2$ and mechanism for rocking it substantially as described; with the rotary shaft G' eccentrically journaled in said sleeve, and a type-pusher on said shaft, all substantially as and for the purpose described.

9. The combination of the rotary type-line receiver, the rotary pusher for forwarding type into the receiver; and the rocking sleeve in which the pusher-shaft is journaled; with the bolt $j$ for locking said receiver, and the means for moving said bolt; the rock-shaft G⁷, actuated by said bolt, and connections between said rock-shaft and the rock-sleeve whereby the sleeve is rocked by the movement of bolt j, all substantially as and for the purpose described.

10. The combination of the type-line receiver, the plungers in the channels thereof, and means for moving said receiver so as to bring its channels successively to the type-receiving and type-ejecting points; with the slide adapted to engage the plungers in the receiver and cause them to eject the lines of type therefrom, and the wedge adapted to put final compression upon the line of type, substantially as and for the purpose specified.

11. The combination of the casing H, the casting h having groove $h^2$ and the rotary type-line receiver within the casing; the slide K having a dovetailed flange engaging groove $h^2$, whereby it is mounted on casting h and adapted to engage plungers in the channels of the receiver; and means for reciprocating said slide, substantially as and for the purpose described.

12. The combination of the channeled type-line receiver; the plungers in the channels thereof; adapted to be projected by the incoming lines of type; and means for pushing said plunger back into the channels to eject the type therefrom; with the wedge L, and its operating mechanism, substantially as described for causing said plungers to justify the line by lineal compression, substantially as and for the purpose described.

13. The combination of the type-line receiver; the followers in the channels thereof; the slide K for causing said followers to eject the lines of type from the receiver; means for reciprocating said slide; and the wedge L adapted to engage the slide and cause it to more powerfully operate the plungers to justify the line of type by lineal compression, substantially as and for the purpose described.

14. The combination with the slide K and its operating mechanism substantially as described; with the wedge L, the yoke L' having cam-flange $L^4$; and the rotating arm $L^2$ adapted to engage said cam-flange; and means for retracting the wedge, all substantially as and for the purpose described.

15. The combination of the casing, the casting h therein, and the slide K on said casting, having roller $K^3$, and means for reciprocating said slide; with the wedge L guided in a slot in said casting and adapted to supplement the action of the slide-reciprocating mechanism, and mechanism substantially as described for operating said wedge, all substantially as and for the purpose described.

16. The combination of the wedge L, and the yoke L' having flanges $L^4$ and $L^5$; with the rotating arm $L^2$ adapted to engage flanges $L^4$, $L^5$; and the rod $l'$ and spring $l$, all constructed and arranged substantially as and for the purpose described.

17. The combination with the receiver, the type-line plungers, the slide for operating the plungers, and the wedge L for the purpose and substantially as described, of the adjustable tapered blocks $h^7$, $h^8$, on opposite sides of said wedge; for the purpose and substantially as described.

18. The combination of the main shaft, a hanger-casting on the main shaft, a stub-shaft on the hanger-casting driven by gearing from the main shaft and a worm on the end of said stub-shaft; an auxiliary shaft, and a worm-gear thereon adapted to be driven by said worm; and means for throwing said worm into engagement with the worm-gear; with a latch adapted to engage said hanger-casting and lock it in position to hold the worm in engagement with the gear, and a pin on said shaft adapted to strike a lug on said latch and cause it to disengage the hanger-casting when the auxiliary shaft has made one complete revolution, substantially as and for the purpose described.

19. The combination of the main shaft, a hanger-casting on the main shaft, a stub-shaft on the hanger-casting driven by gearing from the main shaft and a worm on the end of said stub-shaft; an auxiliary shaft, and a worm-gear thereon adapted to be driven by said worm; a spring adapted to hold said casting in such position that the worm is free of the worm-gear; and means for swinging said hanger-casting so as to bring the worm into engagement with the gear; with a pivoted latch adapted to engage the casting and hold it when the worm and worm-gear are in mesh, said latch having a lug $v$, on its side, and a pin $v'$ on the hub of the worm adapted to strike said lug and disengage the latch from the casting when the auxiliary shaft has made one complete revolution, substantially as and for the purpose described.

20. The combination of the main shaft, a hanger-casting on the main shaft, a stub-shaft on the hanger-casting driven by gearing from the main shaft and a worm on the end of said stub-shaft; an auxiliary shaft, and a worm-gear thereon adapted to be driven by said worm; with the lever $n$, rock-shaft $n'$, crank-arm $n^2$, bar $N^2$ pivotally connecting arm $n^2$ to a depending arm $N'$ of the hanger-casting; and the spring $N^3$ for swinging the worm away from the gear; the pivoted latch V having beveled lug $v$, and the stud $v'$ on the hub of the worm-gear, all substantially as and for the purpose described.

21. The combination of the galley, the rising-and-falling frame $O^4$ having a side bar $O^3$ rising beside the galley provided with groove $O^2$ and mechanism for vibrating said frame, with the rule O having an arm O' engaging groove $O^2$ whereby it is detachably connected to bar $O^3$ substantially in the manner and for the purpose described.

22. The combination of the galley, the plunger therein, the rule-carrying frame having upstanding slotted bar $O^3$; with interchangeable rules O, each having a shank O' adapted to fit in the slot of the bar $O^3$; and mechanisms for operating the rule and plunger at the proper times, substantially as and for the purpose described.

23. The combination of the galley-stand having slot $F^4$, the reciprocating frame $O^4$ attached thereto, having upstanding arm $O^3$; the link $o$, lever $o'$ and cam $o^3$ for reciprocating said frame; with the rule attached to said upstanding arm and overlying slot $F^4$; the lead-box P underlying the galley, the spring-plunger for pressing the leads forward, and the plate $P^6$ attached to frame $O^4$ and adapted to lift a lead into the galley through slot $F^4$ as the rule is lifted, substantially as and for the purpose described.

24. The combination of the ribbon-feeding devices, with the crimping-jaws R, R', for corrugating a space, the eccentric pin for operating jaw R' and mechanism for severing the space from the ribbon, substantially as and for the purpose described.

25. The combination of the ribbon feed-rolls; mechanism for intermittently operating them and the reciprocating cutter $q^3$, with the cam-disk $Q^3$, the arm $q$, stub-shaft $q'$ and arm $q^2$ on said shaft for operating said cutter, after the rolls have fed a proper length of ribbon, substantially as and for the purpose described.

26. The combination of the ribbon feed-rolls; and the reciprocating cutter $q^3$, with the cam-disk $Q^3$, the arm $q$, stub-shaft $q'$ and arm $q^2$ on said shaft for operating said cutter, and the crimping-jaws R, R', and their operating mechanism, substantially as and for the purpose described.

27. The combination of the main shaft, the shaft $Q'$, the friction-gearing between said disk and a driving-shaft; the cam-disk $Q^3$ on said shaft having a tooth on its periphery adapted to be engaged by a dog T, and key-controlled devices whereby said dog is caused to release the tooth and allow the shaft to make one revolution; with the space-making mechanism controlled by and operated from shaft $Q'$, adapted to make one space for each operation of said shaft, substantially as and for the purpose set forth.

28. The combination of the shaft $Q'$, the key-controlled mechanism for releasing it but stopping it again after one revolution; with the sliding and stationary space-crimpers R, R', and the shaft $r'$ geared to shaft $Q'$ having an eccentric pin $r$ on its end for operating the movable crimper, substantially as and for the purpose described.

29. The combination of the shaft $Q'$, the key-controlled mechanism for releasing it but stopping it again after one revolution; and the shaft $r'$ driven from shaft $Q'$; with the ribbon feed-rolls, their shafts, the gear on one feed-roll shaft meshing with a segmental gear on shaft $r'$, and means for locking the feed-roll shafts when the segmental gear is out of mesh, substantially as and for the purpose set forth.

30. The combination of the friction-driven shaft $Q'$, the cam-disk $Q^3$ thereon, the key-controlled catch adapted to engage the disk and lock the shaft; the shaft $r'$ geared to shaft $Q'$, the segmental gear $s^2$ on shaft $r'$; and the ribbon feed-rolls operated by said segmental gear; with the reciprocating cutter, operated by rock-shafts and lever-arms $Q^3$, and the space-crimpers R, R', the sliding one being operated by shaft $r'$, all constructed and arranged to operate substantially as and for the purpose set forth.

31. The combination of a push-rod, a rotating shaft carrying a series of radially-movable dogs adapted to engage the push-rod, and a retractor D' pivoted below and beside the shaft adapted when in normal position to prevent the dogs operating the rod; with a pivoted catch $e$ for holding said retractor in normal position, and a key and mechanical connections substantially as described mediate the key and catch whereby the latter may be disengaged from the retractor, substantially as and for the purpose described.

32. The combination of the type-line receiver, and notched plungers in the channel thereof, substantially as described, and means for causing said plungers to eject lines of type, substantially as described; with the retractor-plate $i$ attached to the casing of the receiver and capable of a slight longitudinal movement, and having a tooth on its front end adapted to be engaged by a plunger just as it finally ejects a line of type, and having a tooth on its rear end adapted to be engaged by the plunger-operating mechanism on its return stroke whereby the retractor is moved back so as to draw the plunger slightly backward, for the purpose and substantially as described.

In testimony that I claim the foregoing as my own I affix my signature in presence of two witnesses.

PAUL FLEMMING COX.

In presence of—
JAMES A. WOOD,
CHAS. R. MURRAY.